US012473217B2

United States Patent
Zhu et al.

(10) Patent No.: US 12,473,217 B2
(45) Date of Patent: *Nov. 18, 2025

(54) SLIGHTLY HEAVY PARTICLE SYSTEM FOR WASTEWATER TREATMENT

(71) Applicant: Wesdon-Tienda Environmental Sciences Co. Ltd., Tianjin (CN)

(72) Inventors: Jingxu Zhu, London (CA); Haibin Li, Guangzhou (CN); Yuanyuan Shao, London (CA); Xiaobo Wang, Guangzhou (CN); Anqi Liu, Guangzhou (CN); Zengli Zhao, Guangzhou (CN); George Nakhla, Woodbridge (CN); Michael Nelson, London (CA)

(73) Assignee: Wesdon-Tienda Environmental Sciences Co. Ltd., Tianjin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,655

(22) Filed: Mar. 29, 2018

(65) Prior Publication Data

US 2018/0282185 A1    Oct. 4, 2018

(30) Foreign Application Priority Data

Mar. 29, 2017    (CN) .......................... 201710198021.2

(51) Int. Cl.
*C02F 1/70*    (2023.01)
*C02F 1/68*    (2023.01)
(Continued)

(52) U.S. Cl.
CPC .................. *C02F 1/70* (2013.01); *C02F 1/68* (2013.01); *C02F 3/085* (2013.01); *C02F 3/1252* (2013.01);
(Continued)

(58) Field of Classification Search
CPC .... C02F 1/70; C02F 1/68; C02F 1/586; C02F 3/2893; C02F 3/2873; C02F 3/2813;
(Continued)

(56) References Cited

U.S. PATENT DOCUMENTS 5,486,291 A * 1/1996 Todd ........................ C02F 3/00
                                                         210/602
7,736,513 B2 * 6/2010 Zhu ......................... C02F 3/085
                                                         210/603
(Continued)

FOREIGN PATENT DOCUMENTS

CN        1453223        11/2003
CN        2791030 Y  *   6/2006
(Continued)

OTHER PUBLICATIONS

Lin et al, English machine translation CN 2791030 Y, pp. 1-5 (Year: 2006).*

(Continued)

*Primary Examiner* — Claire A Norris
(74) *Attorney, Agent, or Firm* — HILL & SCHUMACHER

(57) ABSTRACT

A slightly heavy particle system for wastewater treatment includes a contactor. The contactor includes a gas-liquid-solid three-phase region, and the gas-liquid-solid three-phase region includes gas phase, liquid phase, and solid phase. The liquid phase is the continuous phase and the solid phase is slightly heavy particles. The slightly heavy particles are able to carry some microorganisms on their surfaces at least, and the density of the slightly heavy particles is higher than the density of the liquid. The slightly heavy particle system applied in wastewater treatment can increase the concentration of microorganisms significantly, improve the ability to bear impact load, produce less sludge, and without sludge expansion. Meanwhile, suspending slightly heavy (Continued)

particles with the combined effect of gas and liquid is able to reduce energy consumption to a larger extent. Therefore, this system features with high efficiency and low energy consumption.

17 Claims, 2 Drawing Sheets

(51) Int. Cl.
    *C02F 3/08*     (2023.01)
    *C02F 3/12*     (2023.01)
    *C02F 3/28*     (2023.01)
    *C02F 3/30*     (2023.01)

(52) U.S. Cl.
    CPC .......... *C02F 3/2813* (2013.01); *C02F 3/2873* (2013.01); *C02F 3/2893* (2013.01); *C02F 3/301* (2013.01); *Y02W 10/10* (2015.05)

(58) Field of Classification Search
    CPC ........ C02F 3/1252; C02F 3/301; C02F 3/085; C02F 3/34; C02F 3/2833; C02F 3/2806; C02F 3/109; C02F 3/18; C02F 3/1242; C02F 3/121; C02F 3/006; C02F 3/308; C02F 2203/008; C02F 2203/006; C02F 2209/22; C02F 2209/06; C02F 2003/001; B01D 21/0003; B01D 21/10; B01D 21/0057; B01D 21/0045; B01D 2221/08; B01D 2221/02; Y02W 10/15; B01J 8/226; B01J 2208/00867; B01J 2208/0084
    USPC ....... 210/605, 150, 630, 615, 747.5, 170.01, 210/170.02, 170.09
    See application file for complete search history.

(56) References Cited

U.S. PATENT DOCUMENTS

| | | | |
|---|---|---|---|
| 8,551,341 B2 * | 10/2013 | Conner | B01F 5/10 |
| | | | 210/739 |
| 2016/0115056 A1 * | 4/2016 | Olesen | C02F 3/22 |
| | | | 210/615 |

FOREIGN PATENT DOCUMENTS

| | | | | |
|---|---|---|---|---|
| CN | 102730819 A | * | 10/2012 | |
| CN | 103547535 | | 1/2014 | |
| CN | 203568905 U | * | 4/2014 | |
| CN | 104193005 | | 12/2014 | |
| WO | WO-2007042836 A1 | * | 4/2007 | ................ C02F 3/06 |

OTHER PUBLICATIONS

Sang, Cn 203568905 U, English machine translation, pp. 1-7 (Year: 2014).*

* cited by examiner

SLIGHTLY HEAVY PARTICLE SYSTEM FOR WASTEWATER TREATMENT

FIELD

The present disclosure relates to wastewater treatment, and more particularly the present disclosure relates to a slightly heavy particle system for wastewater treatment.

BACKGROUND

With the population growth and economic development, the demand for water increases and so as the discharge of wastewater, leading to the shortage of water resources. Currently, more and more companies start to utilize green technologies to improve water quality by reducing waste production. However, the effects are not very obvious. In order to achieve the sustainable development of water resources, it is obliged to treat wastewater and turn it into usable water. Therefore, wastewater treatment technologies are very important. Especially, due to the lack of onsite wastewater treatment technologies in the present, wastewater cannot be treated effectively and in time. The consequence is severer water pollution and gradual deteriorating of water quality.

Wastewater mainly consists of domestic wastewater, industrial wastewater, livestock farm wastewater, agricultural wastewater, etc. The major indicators of wastewater include chemical oxygen demand (COD), biochemical oxygen demand (BOD), ammonia nitrogen, and total phosphorus. Wastewater contains a variety of nutrients facilitating the growth of aquatic plants, pathogenic microorganisms which may cause diseases, and toxic chemical compounds that can be carcinogenic or mutagenic. Therefore, from the perspective of protecting human health and the environment, wastewater must be treated before reuse or discharge. A variety of methods for wastewater treatment can be divided into four categories in terms of mechanisms: physical treatment, chemical treatment, physicochemical treatment, and biological treatment. These methods can be applied together when treating wastewater, wherein the biological treatment is the most economical, effective and widely-used method.

Fluidization technology is a type of novel process for wastewater treatment, featuring with high load and high efficiency. It combines the traditional activated sludge process with the biofilm process and introduces the fluidization technology in chemical engineering. By means of fluidization, microorganisms attach to the solid particles and solid particles are suspended in the wastewater system. Since the relatively large specific surface areas of particles are able to increase the concentration of microorganisms in the system, the efficiency of waste water treatment will be improved and the entire system will have low sludge yield and high organic load. In the applications of fluidization, the selection of solid particles is the key factor affecting the efficiency of wastewater treatment. Traditional fluidization systems usually adopt heavy particles much denser than water as the solid phase, where maintaining the fluidization of heavy particles requires large energy consumption and high liquid reflux ratio. Therefore, the current need is to find suitable solid particles and suitable means for particle dispersion for the application in the fluidization wastewater treatment in order to save energy.

SUMMARY

It is the object of the present disclosure to provide a slightly heavy particle system for wastewater treatment to overcome the shortcomings of existing technologies. Firstly, the liquid and solid particles are fed to the wastewater treatment system and then gas is injected. In this case, due to the similar densities of solid and liquid, a slight disturbance of the gas flow is able to disperse the slightly heavy particles in the liquid. The system disclosed herein beneficially provides sufficient interphase contact between the gas, liquid, and solid particles for the given gas injection flow rate ranges and reduces energy consumption.

To attain the above objective, the present disclosure discloses the following technical solutions.

The present disclosure provides a slightly heavy particle system for wastewater treatment comprising a contactor which encloses a chamber. The contactor includes a gas-liquid-solid three-phase region, and the gas-liquid-solid three-phase region includes gas phase, liquid phase, and solid phase. The liquid phase is the continuous phase and the solid phase is slightly heavy particles. The slightly heavy particles are able to carry microorganisms on their surfaces, and the density of the slightly heavy particles is higher than the density of the liquid.

The present disclosure provides a slightly heavy particle system for wastewater treatment. The system comprises a contactor enclosing a chamber with the chamber including a liquid phase, and a solid phase. The liquid phase is a continuous phase and the solid phase is comprised of slightly heavy particles located in the liquid phase and these slightly heavy particles have microorganisms on their surfaces. The density of the slightly heavy particles is higher than the density of the liquid phase. The system includes a gas injection mechanism for injecting gas into the chamber located near a bottom of the chamber to inject gas upwardly into the liquid phase containing the slightly heavy particles located in the chamber. The gas is injected at a gas flow rate that allows the slightly heavy particles to be generally uniformly dispersed in the chamber by the injecting gas. The gas injection mechanism is configured so that the gas phase flows upwardly in the chamber continuously or intermittently.

The density of the slightly heavy particles is higher than the density of the liquid phase and may be lower than or equal to about 150% of the density of the liquid phase.

The density of the slightly heavy particles may be lower than or equal to about 120% of the density of the liquid phase.

The contactor also may include a liquid-solid two-phase region and the liquid-solid two-phase region includes liquid phase and solid phase.

The environment of the contactor may be anaerobic, anoxic, or aerobic.

The gas phase flows upward continuously or intermittently and said slightly heavy particles are dispersed in the liquid phase.

The volume fraction of the gas phase is less than or equal to 25% in the gas-liquid-solid three-phase region.

The shape of the contactor may be a regular shell or an irregular shell, wherein the regular shell is preferably a rectangular shell, and wherein the lower surface of the rectangular shell is fully closed or partially closed.

The density of the slightly heavy particles may be uniform or non-uniform and wherein the size of said slightly heavy particles is uniform or non-uniform.

The contactor may include micro-channels, wherein the micro-channels contain several layers of packing and every layer of the packing contains some channel elements, wherein the channel elements in each layer are interlaced, and wherein the micro-channels are preferably located near the bottom of the contactor.

The channel elements may be cubic, rectangular, or other shapes of channels.

The system may be used as a wastewater treatment system, wherein wastewater is fed into the slightly heavy particle system and the treated wastewater is discharged from the treatment system. Multiple slightly heavy particle systems may be cascaded or coupled serially together and are interconnected by pipes.

In this wastewater treatment process slightly heavy particles may be added and discharged continuously or intermittently in the slightly heavy particle system.

In this wastewater treatment process the liquid phase may be added and discharged continuously or intermittently in the slightly heavy particle system.

In this wastewater treatment process the liquid phase may be added from the bottom of the gas-liquid-solid three-phase region.

In this wastewater treatment process the gas may be aerated intermittently when the environment of the contactor is anaerobic or anoxic and said gas is aerated intermittently or continuously when the environment of the contactor is aerobic.

Compared to the existing technology, the present system has the following advantages: injecting gas into the liquid phase disperses the slightly heavy particles in the liquid by the disturbance of gas to liquid and solid. The relatively large specific surface areas of slightly heavy particles provide adequate surface area for the attachment of microorganisms and provides the benefit of sufficient contact between the microorganisms and wastewater, accelerating the biochemical reactions. Therein contains a slightly heavy particle system for wastewater treatment which can increase the concentration of microorganisms significantly, improve the ability to bear impact load, produce less sludge, and minimizing sludge expansion. In addition, the ability to suspend the slightly heavy particles with the combined effect of gas and liquid is able to reduce energy consumption to a larger extent. Therefore, this system disclosed herein provides high efficiency and low energy consumption.

A further understanding of the functional and advantageous aspects of the present disclosure can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which.

DETAILED DESCRIPTION

Figure 1:
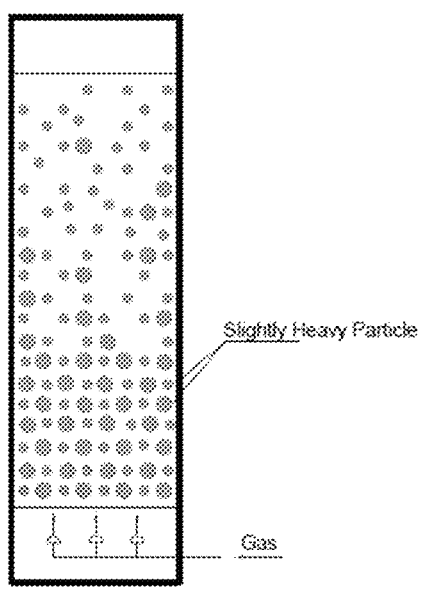
FIG. 1 is the schematic diagram of the slightly heavy particle suspension system in the present disclosure.

Various embodiments and aspects of the disclosure will be described with reference to details discussed below. The following description and drawings are illustrative of the disclosure and are not to be construed as limiting the disclosure. The drawings are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

As used herein, the phrase "slightly heavy particles" refers to particles having a density in a range which is higher than the density of the liquid and lower than or equal to 150% of the density of said liquid. Preferably, the density of the slightly heavy particles is between the density of the liquid and lower than or equal to 120% of the density of the liquid.

As used herein, the term "microorganisms" refers to microscopic organisms which may exist in the wastewater and biological wastewater treatment systems. In particular, the microbial culture of the biological wastewater treatment system includes both heterotrophic and autotrophic bacteria of the types observed in conventional activated sludge processes. The heterotrophic bacteria is primarily responsible for the biodegradation of organics, denitrification, and phosphorous uptake etc. and include but are not limited to various *Pseudomonas, Clostridium, Bacillus*, and *Salmonella* species, *Actinomyces, Acinetobacter, Corynebacterium, Escherichia Coli, Klebisella, Staphylcocus, Streptococcus, Vibrio Cholerae*. The autotrophic bacteria, that utilizes inorganic carbon predominantly in the form of alkalinity, is primarily responsible for nitrification in the process and consists of bacteria such as *Nitrosomonas, Nitrobacter, Nitrosococus*, and *Nitrospira*. It must be asserted that the biofilms attached on the media usually comprise both heterotrophic and autotrophic bacteria."

To better understand the slightly heavy particle system for wastewater treatment, the present system will be illustrated as follows. In an embodiment, the present system discloses a slightly heavy particle system for wastewater treatment, comprising a contactor. The contactor includes a gas-liquid-solid three-phase region, and the gas-liquid-solid three-phase region includes a gas phase, a liquid phase, and a solid phase. The liquid phase is the continuous phase and the solid phase is slightly heavy particles. The slightly heavy particles are able to carry some microorganisms on their surfaces at least, and the density of the slightly heavy particles is higher than the density of the liquid. The density of the slightly heavy particles is uniform or non-uniform and the size of the slightly heavy particles is uniform or non-uniform.

It is easy to understand that when the system is used for wastewater treatment, the contactor contacts with the wastewater treated by the slightly heavy particle suspension system to implement wastewater treatment. This embodiment creatively combines the characteristics of three aspects, including sufficient contact between gas, liquid, and solid, easy suspension of slightly heavy particles in the liquid, and slightly heavy particles being able to carry microorganisms on their surface. As a result, when the system is applied to wastewater treatment, relatively large surface areas of particles provide adequate space for microorganisms to attach. Since microorganisms grow and shed on the surface of suspended particle media and renew continuously, the concentration of microorganisms in the system can be increased effectively. Hence, it would be easy for microorganisms to produce metabolic degradation reaction with organic pollutants, and/or nitration and denitrification with ammonia and nitrogen, and/or phosphorus release and uptake with phosphorus, which promotes the efficiency of wastewater treatment. In addition, this embodiment may select microorganisms corresponding to the features of specific wastewater.

Injecting gas or liquid into the above system (can also be both gas and liquid), by the separate gas or liquid or the gas-liquid mixture, slightly heavy particles in the system are able to be fluidized and uniformly dispersed in the system. Meanwhile, microorganisms carried by the particles move around with the motion of particles to treat the surrounding wastewater. It is easy to understand that the gas or liquid is mainly used for the flow of the particles. Thus, the liquid can be untreated wastewater or other liquid besides untreated wastewater, as long as such liquid does not hinder or go against wastewater treatment. The gas is normally air but can be other types of gases and gases containing oxygen also provide oxygen necessary for certain biological processes such as aerobic reactions. If the microbial content is high and controlling the system is easy, it would take few efforts to increase the capacity of the system for wastewater treatment.

Regarding the density of slightly heavy particles, when the difference between the density of the slightly heavy particles and the density of the liquid is too large for a given volume, larger driving force is required to overcome the gravity of slightly heavy particles and thus energy consumption is higher. It is easier for slightly heavy particles having a density close to the density of the liquid to suspend in the liquid phase. Based on this discovery by the inventors, the size of the slightly heavy particles is changeable. The material and shape of particles are various, such as polyethylene, polystyrene, glass beads, and zeolites, not excluding other particles. The preferable choices are particles with large specific surface areas, a shape similar to spheres, a density close to the liquid, and great liquid contact ability. When applied to wastewater treatment, a better selection is particles with a surface suitable for the growth of microorganisms.

The slightly heavy particles may possess one or more micropores in which microorganisms enrich before or during the process of wastewater treatment. Furthermore, the slightly heavy particles can include micropores and one or more cavities connecting to the micropores at the same time. Microorganisms are enriched inside the cavities in advance and contact with wastewater to perform mass transfer via micropores. The microorganisms can be carried by particles before the wastewater treatment or exist in the wastewater and enriched during the treatment.

Furthermore, in an embodiment, to maintain the suspension of particles in the system, the velocity of the fluid should be higher than the minimum fluidization velocity and lower than the terminal velocity of particles. The terminal velocity of particles refers to the transition velocity from the fluidized bed to the transport bed.

In another embodiment, the environment of the contactor is anaerobic, anoxic, or aerobic and different pollutants are treated in different environments. If it is possible to combine the anaerobic, anoxic, and aerobic environments, this system can be applied to assorted circumstances.

In another embodiment, the contactor includes a liquid-solid region and the liquid-solid region includes liquid phase and solid phase. The gas-liquid-solid three-phase system may be faced with the absence of gas, thus the liquid-solid region is included in the contactor in this embodiment. Particularly, when wastewater treatment targets anaerobic and/or anoxic environments or the gas adopts either intermittent aeration or no aeration instead of continuous supply, the above embodiment should be referred. Moreover, the solid phase of the liquid-solid region in this embodiment can be slightly heavy particles with outer surfaces carry microorganisms and with a density higher than the density of the liquid.

In another embodiment, the gas phase flows upward continuously or intermittently, and pass through the container in the form of bubbles. The disturbance created by the rising gas bubbles cause the slightly heavy particles to become more dispersed in the liquid. Increasing gas velocity makes the slightly heavy particles more dispersed or even uniformly distributed. The dispersion of slightly heavy particles in the liquid benefits the sufficient contact between microorganisms and wastewater and accelerates biochemical reactions. Gas can be fed into the system continuously or intermittently and the amount of aeration depends on the oxygen requirements of the wastewater treatment system, which saves energy and increases reaction efficiency.

Moreover, in the slightly heavy particle system for wastewater treatment, the density of the slightly heavy particles is higher than the density of the liquid and lower than or equal to 150% of the density of the liquid. Preferably, the density of the slightly heavy particles is lower than or equal to 120% of the density of the liquid. If the density of the slightly heavy particles is higher than 150% of the liquid, the difference between the density of the slightly heavy particles and the liquid density is too large for a given volume, requiring larger driving force to overcome the gravity of slightly heavy particles and lead to higher energy consumption. It is easier for slightly heavy particles with the density close to the liquid density to suspend in the liquid. If the energy consumption is not important, the range for the density of slightly heavy particles would be wide.

Preferably, the volume fraction of slightly heavy particles in the gas-liquid-solid three-phase region should be less than or equal to 30%. Adding larger amount of particles will lower the volume fraction of the gas and liquid. Hence, it is more difficult for particles to achieve complete suspension as well as hinders sufficient contact and mass transfer between the three phases. In other cases, the decreased volume fraction of the gas and liquid may lead to inadequate gas and liquid for contacting with particles, affecting the mass transfer rate between the three phases. Preferably, in the other embodiment, the volume fraction of the gas phase is less than or equal to 25% in the gas-liquid-solid three-phase region. If the volume fraction of the gas phase is too large, it is easy for bubbles to coalesce and form large bubbles in the system, causing non-uniform dispersion of particles and affecting the efficiency of three-phase contact reaction.

In the other embodiment, in the slightly heavy particle system for wastewater treatment, the shape of the contactor is a regular shell or an irregular shell. Preferably, the regular shell is a rectangular shell and the lower surface of the rectangular shell is fully closed or partially closed. It is easy to understand that a proper shape can be selected for the contactor depending on specific application scenarios.

Moreover, in the slightly heavy particle system for wastewater treatment, the contactor is installed with micro-channels. The micro-channels contain several layers of packing, each layer of the packing contains some channel elements, and the channel elements in each layer are interlaced. Preferably, the micro-channels are located at the bottom of the contactor. These micro-channels allow the fluid to be uniformly distributed before entering the gas-liquid-solid three-phase system, which facilitates subsequent contact and mass transfer between phases.

Furthermore, the channel elements are cubic, rectangular, or other types of cross sections. This embodiment discloses the particular selection of channel elements. In principle, regular-shaped channels, such as cubic or rectangular shapes, can be a preferable choice for channels, beneficial for reducing unnecessary energy consumption during distribution.

Besides, in the other embodiment, the present disclosure discloses a process for wastewater treatment using the slightly heavy particle system. Wastewater is fed into the slightly heavy particle system and the treated wastewater is discharged from the slightly heavy particle system. Relying on this process, water circulation system can process wastewater continuously.

In the other embodiment, the process of slightly heavy particle wastewater treatment can be detailed as follows: the wastewater system is equipped with slightly heavy particles with a certain volume and carrying microorganisms, as described above. Wastewater flows into the system from the top or bottom of the system intermittently or continuously. Gas is fed from the bottom of the apparatus and enters the system through the aeration device. As the gas velocity increases, since the average density of solid particles is close to the density of liquid water (or the density of wastewater in specific cases), a slight disturbance of the gas is capable of fluidizing the slightly heavy particles at the bottom upward. Further increasing the gas velocity to an appropriate value, slightly heavy particles would be uniformly dispersed in the system by the gas and liquid. During this process, microorganisms adhered on the solids treat the wastewater, and the treated water is discharged from the system. Preferably, a self-circulating device of water may be additionally employed in the system to increase the hydraulic retention time.

Furthermore, multiple the slightly heavy particle systems are applied wherein any of the slightly heavy particle systems are connected with at least one of other slightly heavy particle systems by liquid communication means. For this embodiment, a plurality of the slightly heavy particle systems are used together to enhance the ability of wastewater treatment. Additionally, when multiple the slightly heavy particle systems are used together, the environment of the contactor may be anaerobic, anaerobic, aerobic, or their combination.

In the other embodiment, in the slightly heavy particle system, the slightly heavy particles are added or discharged continuously or intermittently. For this embodiment, the slightly heavy particles are added into the system continuously or intermittently and taken out of the slightly heavy particle system continuously or intermittently, making it easy for particle circulation. If the slightly heavy particles are continuously added to the system and continuously withdrawn from the system, it benefits the recycling of the solid particles and facilitates continuous industrial production. If the slightly heavy particles are intermittently added to the system and intermittently removed from the system, it can be used for intermittent reactions and for chemical processes where the solid phase is not often replaced.

Moreover, in the other embodiment, in the slightly heavy particle system, the liquid phase is added or discharged continuously or intermittently. Optionally, the liquid phase is fed from the top of the gas-liquid-solid three-phase region.

In addition, when the environment of the contactor is anaerobic or anoxic, the gas phase is aerated intermittently. When the environment of the contactor is aerobic, the gas phase is aerated intermittently or continuously. Based on the oxygen demand of biological environments, different aeration methods can effectively control the oxygen content in the system to provide the best environment for the growth of microorganisms.

APPLICATIONS OF THE PRESENT SYSTEM

The application of the present system will be further described below in relation to wastewater treatment, but it may also be used in other applications, for example, effluent treatment from a host of industrial processes.

The present system will now be illustrated using the following non-limiting example.

EXAMPLE

FIG. 1 is the schematic diagram of the slightly heavy particle suspension system in the present disclosure. In the embodiment as shown in FIG. 1, the slightly heavy particle suspension system of the present disclosure includes the gas-liquid-solid three-phase region. The gas-liquid-solid three-phase region includes the gas phase, liquid phase, and solid phase. The liquid phase is wastewater to be treated and the gas phase is air. Air not only offers sufficient oxygen to the system but also provides the power to mix particles completely.

Figure 2:
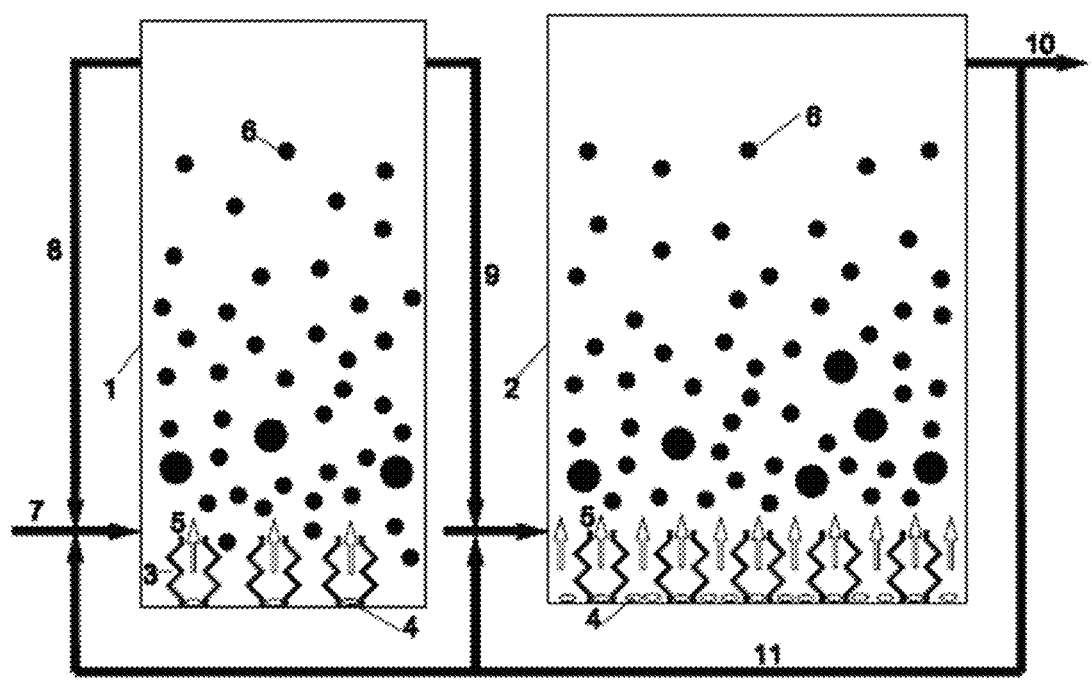
FIG. 2 is the schematic diagram of the embodiment using the slightly heavy particle system for wastewater treatment. The meanings of the labels in FIG. 2 are: 1. Anoxic zone; 2. Aerobic zone; 3. High-efficiency packing; 4. Aeration tubes; 5. Air; 6. Slightly heavy particles; 7. Wastewater; 8 to 11. Pipes.

FIG. 2 presents the schematic diagram of an embodiment of the slightly heavy particle system or apparatus configured for wastewater treatment, and this apparatus includes two contactors. Contactor 1 and contactor 2 are biological reaction zones. Contactor 1 is the anoxic zone with its size being 0.5 m×1 m×6 m (length×width×height) (can also be other size combination, such as 0.6 m×0.8 m×5 m and 1 m×0.8 m×8 m). Contactor 2 is the aerobic zone with its size being 1 m×1 m×6 m (length×width×height) (can also be other size combination, such as 1.2 m×0.8 m×5 m and 2 m×0.8 m×8 m). High-efficiency packing is marked as 3 in the Figure. Both contactor 1 and contactor 2 are equipped with high-efficiency packing layers placed at the bottom of the contactors. It will be appreciated by those skilled in the art that these dimensions are purely exemplary and may be scaled up or down depending on the application for which the system is to be configured.

This setup provides sites for the attachment of microorganisms and contributes to more uniform gas distribution. Aeration tubes 4 are arranged at the bottom of contactors, adopting a uniform arrangement on the cross section of the system. The amount of aeration in the anoxic zone is smaller than that in the aerobic zone, and the number of aeration tubes in contactor 2 is larger than that in contactor 1. Air 5 is used as the gas and aeration tubes are microporous leather tubes with a diameter of 10 cm. Contactor 1 and contactor 2 are both loaded with slightly heavy particles 6, which have a density of 1070 kg/m$^3$ and an equivalent diameter of 1.5 mm (can also be slightly heavy particles with a diameter smaller than 5 mm and a density between 1000 kg/m³ and 1500 kg/m³). Wastewater 7 enters the biological reaction zone 1, which has a small amount of aeration and triggers anoxia reactions such as denitrification.

To achieve better fluidization of slightly heavy particles in the biological reaction zone 1, internal circulation is added to the biological reaction zone 1, i.e., a portion of the water is taken from the top of the biological reaction zone 1 to the bottom, which improves wastewater treatment in the anoxic zone. The wastewater treated in the biological reaction zone 1 flows into the biological reaction zone 2 through pipe 9, and aerobic reactions occur in the biological reaction zone 2 due to a large amount of aeration. The wastewater passing through the biological reaction zone 2 reaches the corresponding emission standards and can be discharged through pipe 10. Part of the wastewater flows back to the bottom of the biological reaction zone 1 or biological reaction zone 2 through pipe 11.

Wastewater treatment experiments using this apparatus possessed a daily capacity of 140 tons. During the operation period, the average COD of the inflow was 250 g/m³, the average $NH_4$—N was 30 g/m³, the total nitrogen was 36 g/m³, and the total phosphorus was 1.8 g/m³. After 2.0 hours of hydraulic retention time, 90% of COD, 96% of total nitrogen, and 85% of total phosphorus were removed. The effluent met the water standards of "Surface Water Environmental Quality Standards" (GB3838-2002) Class IV.

In summary, the present disclosure provides a slightly heavy particle system for wastewater treatment. Applying this system to wastewater treatment can effectively increase the concentration of microorganisms. Its advantages include high treatment efficiency, low energy consumption, low sludge yield, and light organic load.

The present disclosure provides a slightly heavy particle system for wastewater treatment that differs from copending US Patent Publication No. US 2018/0280907, published Oct. 4, 2018, entitled "Light Particle or Mixed Particle System for Wastewater Treatment" in the following ways. In the embodiment of this copending application that just uses light particles, the major differences are the light particles are suspended in the water mostly by the change of the density of the liquid after gas being injected. The appearance of the gas bubbles causes the decrease of the density of the gas-liquid mixture and the light particles floating at the top begin to expand downwards when the density of the gas-liquid mixture become very equal or less than the density of the light particles. At the same time, the rising bubbles also cause nearby liquid to flow upwards, leading to the downflow of liquid in other regions which causes the light particles to be entrained downwards.

In the mixed embodiment using light and heavy particles, the major differences are the existence of the light particles lead to more even distribution of the mixed particles, especially at lower gas velocities. In the slightly heavy particle system, the particles initially settle at the bottom and as the gas velocity increases, more particles suspend upwards gradually. In other words, with the slightly heavy particles alone, the vertical distribution of the slightly heavy particles will not be uniform until the gas velocity become very high. The existence of the light particles would just compensate for this, as those light particles will have higher concentrate at the top, just contrary to the situation with the heavy particle. Therefore, the net effect of having the mixed particles (light+heavy) will lead to more uniform distribution in the system.

In an embodiment the present disclosure provides a slightly heavy particle system for wastewater treatment, comprising:

a contactor enclosing a chamber, the contactor including gas-liquid-solid three-phase region within the chamber, and the gas-liquid-solid three-phase region including a gas phase, a liquid phase, and a solid phase; the liquid phase being a continuous phase and the solid phase comprised of slightly heavy particles, the slightly heavy particles being able to carry microorganisms on their surfaces, and wherein a density of the slightly heavy particles being higher than the density of the liquid phase; and a gas injection mechanism for injecting gas into the chamber, and wherein in operation the gas flow rate is selected so that the slightly heavy particles are generally uniformly dispersed in the chamber by the injecting gas.

In an embodiment the density of the slightly heavy particles is higher than the density of the liquid phase and is lower than or equal to about 150% of the density of the liquid phase.

In an embodiment the density of the slightly heavy particles is lower than or equal to about 120% of the density of the liquid phase.

In an embodiment the contactor includes a liquid-solid two-phase region and the liquid-solid two-phase region includes liquid phase and solid phase.

In an embodiment the environment of the contactor is anaerobic, anoxic, or aerobic.

In an embodiment the gas phase flows upward continuously or intermittently and said slightly heavy particles are dispersed in the liquid phase.

In an embodiment the volume fraction of the gas phase is less than or equal to 25% in the gas-liquid-solid three-phase region.

In an embodiment the shape of the contactor is a regular shell or an irregular shell, wherein the regular shell is preferably a rectangular shell, and wherein the lower surface of the rectangular shell is fully closed or partially closed.

In an embodiment the density of the slightly heavy particles may be uniform or non-uniform and wherein the size of said slightly heavy particles is uniform or non-uniform.

In an embodiment the contactor includes micro-channels, wherein the micro-channels contain several layers of packing and every layer of the packing contains some channel elements, wherein the channel elements in each layer are interlaced, and wherein the micro-channels are preferably located near the bottom of the contactor.

In an embodiment the channel elements may be cubic, rectangular, or other shapes of channels.

The system may be used as a wastewater treatment system, wherein wastewater is fed into the slightly heavy particle system and the treated wastewater is discharged from the treatment system. Multiple slightly heavy particle systems may be cascaded or coupled serially together and are interconnected by pipes.

In an embodiment of the wastewater treatment process the slightly heavy particles may be added and discharged continuously or intermittently in the slightly heavy particle system.

In an embodiment of the wastewater treatment process the liquid phase may be added and discharged continuously or intermittently in the slightly heavy particle system.

In an embodiment of the wastewater treatment process the liquid phase is added from the bottom of the gas-liquid-solid three-phase region.

In an embodiment of the wastewater treatment process the gas is aerated intermittently when the environment of the contactor is anaerobic or anoxic and said gas is aerated intermittently or continuously when the environment of the contactor is aerobic.

The foregoing description of the preferred embodiments of the disclosure has been presented to illustrate the principles of the disclosure and not to limit the disclosure to the particular embodiments illustrated. Each embodiment is described in a progressive manner. The same or similar sections of each embodiment can be referred to each other and each embodiment emphasizes on the differences from other embodiments. Any minor modifications made to the above embodiments according to the technical substance of the present disclosure is equivalent to substitution and improvement and shall be included within the scope of the present disclosure as defined by the appended claims.

Therefore, what is claimed is:

1. A slightly heavy particle fluidized bed system for wastewater treatment, comprising:
    a contactor enclosing a chamber, a liquid wastewater inlet near a bottom of the chamber for flowing liquid wastewater into said chamber, said chamber enclosing a gas-liquid-solid three phase region within said chamber when gas is being injected into said chamber when liquid wastewater is flowing into said chamber and when a solid phase is located in the liquid wastewater, said liquid wastewater being a continuous phase and said solid phase comprised of slightly heavy particles, said slightly heavy particles having microorganisms on their surfaces; and
    a gas injection system which includes a gas source and a plurality of aeration tubes connected to said gas source for injecting gas into said chamber located at a bottom of said chamber and below the liquid wastewater inlet to give a uniform array of aeration tubes extending across the chamber to inject gas upwardly into said liquid wastewater phase containing said slightly heavy particles located in said chamber, the gas being injected at a gas flow rate that allows the slightly heavy particles to be generally uniformly dispersed in the chamber by the injecting gas, and wherein said plurality of aeration tubes are configured so that the gas phase flows upwardly in said chamber continuously or intermittently to form a fluidized bed with the slightly heavy particles uniformly dispersed therein; and
    wherein the gas injected upwardly into the liquid phase containing the slightly heavy particles causes the slightly heavy particles to be uniformly dispersed and suspended in the liquid phase and not undergoing directional flow circulation.

2. The slightly heavy particle system for wastewater treatment according to claim 1, wherein the density of said slightly heavy particles is higher than the density of said liquid wastewater and lower than or equal to about 150% of the density of said liquid wastewater.

3. The slightly heavy particle system for wastewater treatment according to claim 2, wherein the density of said slightly heavy particles is lower than or equal to about 120% of the density of said liquid wastewater.

4. The system for wastewater treatment according to claim 1, wherein when there is no gas injection said liquid wastewater and said slightly heavy particles form a liquid-solid two-phase region.

5. The slightly heavy particle system for wastewater treatment according to claim 1, wherein an environment of said contactor is anaerobic, anoxic, or aerobic.

6. The slightly heavy particle system for wastewater treatment according to claim 1, wherein said injection system is configured to be operated in two modes, a first mode being to flow the gas continuously upwardly, and a second mode being to flow the gas intermittently upwardly so that said slightly heavy particles are dispersed in said liquid wastewater.

7. The slightly heavy particle system for wastewater treatment according to claim 1, wherein when liquid wastewater, slightly heavy particles and gas is present a gas-liquid-solid three-phase region is formed and wherein, the volume fraction of said gas phase is less than or equal to 25% in said gas-liquid-solid three-phase region.

8. The slightly heavy particle system for wastewater treatment according to claim 1, wherein the shape of said contactor is a regular shell or an irregular shell.

9. The slightly heavy particle system for wastewater treatment according to claim 8 wherein said regular shell is a rectangular shell, and wherein the lower surface of said rectangular shell is fully closed or partially closed.

10. The slightly heavy particle system for wastewater treatment according to claim 1, wherein the density of said slightly heavy particles is uniform or non-uniform and wherein the size of said slightly heavy particles is uniform or non-uniform.

11. A process for wastewater treatment using a slightly heavy fluidized bed particle system including steps of:
    feeding wastewater into said slightly heavy particle system comprising: a contactor enclosing a chamber, said chamber including a liquid wastewater inlet near a bottom of the chamber for flowing liquid wastewater into said chamber, a solid phase comprised of slightly heavy particles, said slightly heavy particles having microorganisms on their surfaces, said slightly heavy particles having a density that is higher than the density of said liquid wastewater phase; and
    injecting gas into said chamber located along a bottom of said chamber using a gas injection system which includes a gas source and a plurality of aeration tubes connected to said gas source spread uniformly across the chamber to inject gas upwardly into said liquid wastewater phase containing said slightly heavy particles located in said chamber, the gas being injected at a gas flow rate that allows the slightly heavy particles to be generally uniformly dispersed in the chamber by the injecting gas, and wherein said plurality of aeration tubes are configured so that the gas phase flows upwardly in said chamber continuously or intermittently to form a fluidized bed with the slightly heavy particles, wherein the gas injected upwardly into the liquid phase containing the slightly heavy particles causes the slightly heavy particles to be uniformly dispersed and suspended in the liquid phase and not undergoing directional flow circulation; and
    discharging the treated wastewater from said slightly heavy particle system.

12. The process according to claim 11, wherein multiple slightly heavy particle systems are coupled serially together and are interconnected by pipes, and wherein each chamber of each slightly heavy particle system has contained therein fluidized slightly heavy particles, and wherein no chamber is absent fluidized slightly heavy particles.

13. The process according to claim 11, wherein said slightly heavy particles are added and discharged continuously or intermittently in said slightly heavy particle system.

14. The process according to claim 11, wherein said liquid wastewater is flowed into and discharged from the chamber continuously or intermittently in said slightly heavy particle system.

15. The process according to claim 11, wherein said liquid wastewater is flowed into the chamber from the bottom of said gas-liquid-solid three-phase region.

16. The process according to claim 11, wherein said gas is aerated intermittently when the environment of the contactor is anaerobic or anoxic and said gas is aerated intermittently or continuously when the environment of the contactor is aerobic.

17. A waste water treatment system, comprising a plurality of slightly heavy particle fluidized bed systems, each slightly heavy particle fluidized bed system of the plurality of slightly heavy particle fluidized bed systems being according to claim 1, wherein the slightly heavy particle fluidized bed systems of the plurality of slightly heavy particle fluidized bed systems are coupled serially together and are interconnected by pipes, and wherein each chamber of each slightly heavy particle fluidized bed system has contained therein fluidized slightly heavy particles, and wherein no chamber is absent fluidized slightly heavy particles.

\* \* \* \* \*